United States Patent
Boucher et al.

(10) Patent No.: US 11,320,661 B2
(45) Date of Patent: May 3, 2022

(54) DEVICE FOR CHANGING THE SHAPE OF A LIGHT BEAM

(71) Applicant: CAILabs, Rennes (FR)

(72) Inventors: Pauline Boucher, Nogent-sur-Marne (FR); Olivier Pinel, Rennes (FR); Jean-François Morizur, Rennes (FR); Guillaume Labroille, Rennes (FR); Nicolas Treps, Paris (FR)

(73) Assignee: CAILabs, Rennes (FR)

( * ) Notice: Subject to any disclaimer, the term of this patent is extended or adjusted under 35 U.S.C. 154(b) by 455 days.

(21) Appl. No.: 16/479,174

(22) PCT Filed: Jan. 19, 2018

(86) PCT No.: PCT/FR2018/050131
§ 371 (c)(1),
(2) Date: Jul. 18, 2019

(87) PCT Pub. No.: WO2018/134533
PCT Pub. Date: Jul. 26, 2018

(65) Prior Publication Data
US 2019/0353911 A1    Nov. 21, 2019

(30) Foreign Application Priority Data
Jan. 19, 2017    (FR) ...................................... 1750403

(51) Int. Cl.
*G02B 26/00* (2006.01)
*G02B 27/09* (2006.01)
(Continued)

(52) U.S. Cl.
CPC ......... *G02B 27/0938* (2013.01); *G02B 26/06* (2013.01); *G02B 26/0816* (2013.01); *G02B 26/0833* (2013.01); *G02B 27/0977* (2013.01)

(58) Field of Classification Search
CPC ................ G02B 27/0938; G02B 26/06; G02B 26/0816; G02B 26/0833; G02B 27/0977
(Continued)

(56) References Cited

U.S. PATENT DOCUMENTS 5,835,280 A    11/1998    Griffith

FOREIGN PATENT DOCUMENTS

| EP | 2469221 A1 | 6/2012 | |
| FR | 3016973 B1 | 8/2017 | |
| WO | WO-2019129518 A1 * | 7/2019 | ........... G02B 17/004 |

OTHER PUBLICATIONS

International Search Report for International Application No. PCT/FR2018/050131 dated Apr. 11, 2018, 2 pages.
(Continued)

*Primary Examiner* — William Choi
(74) *Attorney, Agent, or Firm* — TraskBritt

(57) ABSTRACT

A device for alternating between different shapes of a light beam includes a multi-plane light conversion (MPLC) device that is used to apply a unitary transformation to a light beam by way of a succession of elementary transformations. The MPLC faces the light source so that the light beam is emitted into the MPLC device along a reference axis. The device further includes automated means arranged upstream of the multi-plane light conversion (MPLC) device for varying the transverse position and/or the angle of incidence of the light beam in relation to the reference axis and/or to vary the angle of rotation of the light beam about the reference axis. The MPLC device is designed to transform a variation of the transverse position and/or the angle of incidence and/or the angle of rotation of the light beam into a modification of the specific shape of the light beam.

10 Claims, 4 Drawing Sheets

(51) Int. Cl.
     *G02B 26/08*          (2006.01)
     *G02B 26/06*          (2006.01)
(58) Field of Classification Search
     USPC ......................................................... 359/290
     See application file for complete search history.

(56)            References Cited

OTHER PUBLICATIONS

International Written Opinion for International Application No.
PCT/FR2018/050131 dated Apr. 11, 2018, 6 pages.

* cited by examiner

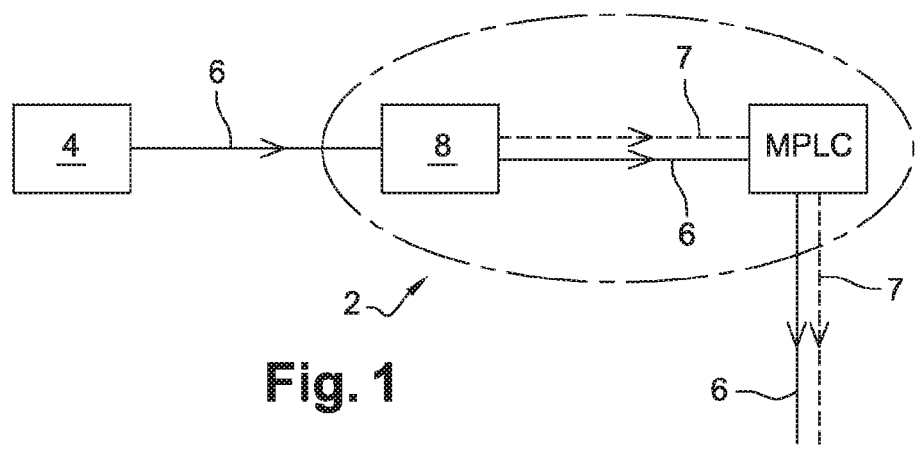
Fig. 1
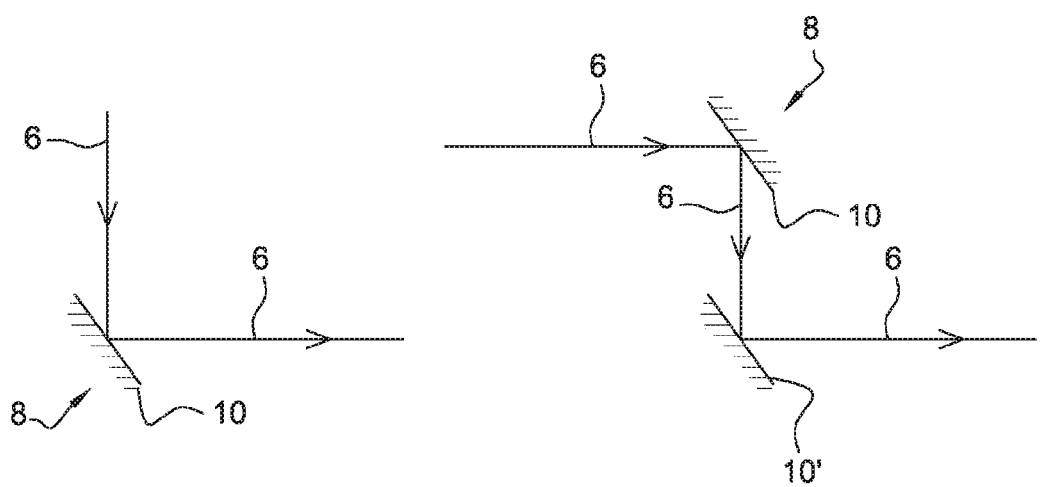
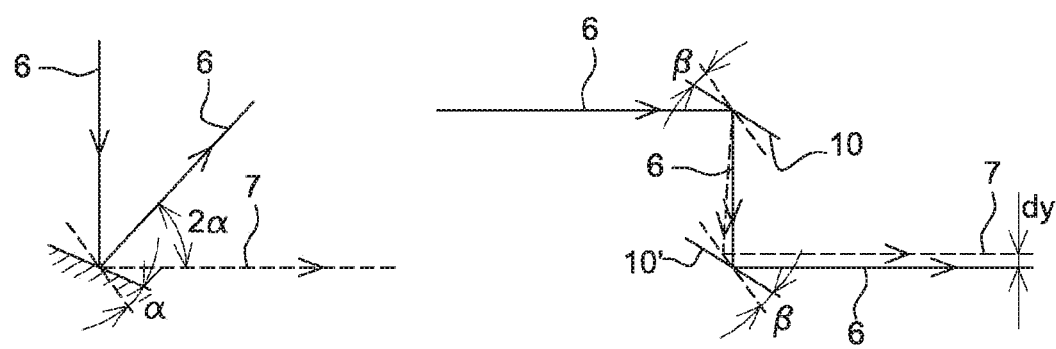
Fig. 2a          Fig. 2b

DEVICE FOR CHANGING THE SHAPE OF A LIGHT BEAM

CROSS-REFERENCE TO RELATED APPLICATIONS

This application is a national phase entry under 35 U.S.C. § 371 of International Patent Application PCT/FR2018/050131, filed Jan. 19, 2018, designating the United States of America and published as International Patent Publication WO 2018/134533 A1 on Jul. 26, 2018, which claims the benefit under Article 8 of the Patent Cooperation Treaty to French Patent Application Serial No. FR 17/50403, filed Jan. 19, 2017.

TECHNICAL FIELD

The present disclosure relates to a method for processing a light beam. The present disclosure also relates to a processing device enabling such processing to be carried out, and more particularly a device for changing the shape of a light beam.

BACKGROUND

Laser beams are used in many types of industries because of their interesting properties. Examples include laser cutting in the field of mechanics, optical fibers in the field of telecommunications, or the various measurement methods that involve use of a laser. One of the most interesting properties of a laser beam is that it is a coherent light beam.

In each of these applications, in order to benefit as much as possible from the properties of the laser beam, it is preferable, if not necessary, to modify certain parameters of the laser beam once emitted by its source before using it, in particular, the parameters of the transverse profile of the beam, i.e., the amplitude, phase and polarization of the beam. In all that follows, the term "parameter" will systematically refer to a parameter of the transverse profile of the light beam, unless otherwise stated.

Two types of parameters exist.

The first type of parameters can be mastered. This makes it relatively easy to control these parameters to vary them continuously, quickly (i.e., at high frequency) and/or with high accuracy. The position of the beam or its orientation with respect to a reference axis are of this first type of parameter.

On the other hand, the parameters of the second type can be controlled, but with less freedom than those of the first type. For example, such a parameter can be controlled with high accuracy, but only with a sufficiently low control frequency. The defocusing of the beam is part of this second type of parameter.

When it is necessary to modify a parameter of the second type, and when it is necessary to master the modification of the parameter of the second type, it would be interesting to benefit from the advantages of the parameters of the first type.

Some devices convert the variation of a specific laser beam parameter into a variation of an equally specific laser beam parameter. As a result, these devices are only suitable for a limited number of laser beam applications. Among these devices are converging lenses that, in the so-called Fourier configuration, make it possible to carry out the Fourier transform of the complex amplitude profile of the beam, transforming, in particular, an angle with respect to the optical axis of the lens into a displacement in the plane normal to this axis. Conversely, a movement in the plane normal to the optical lens axis results in an angle with respect to that axis. The Kerr effect of self-focusing is noted, by which the intensity profile modifies the transverse profile through interactions with the material traversed by the laser beam. Thus, the intensity of a beam determines the focusing it will undergo when passing through the material. Finally, networks allow the transverse profile of the reflected or transmitted beam to be modified by changing the angle of incidence of the beam on the network.

In addition, one of the devices conventionally used to modify the shape of a light beam works as an absorption device. In general and in a simplified way, this type of device consists of a plate with an opening of predetermined shape through which the beam is passed. Thus, the plate material around the opening absorbs the part of the beam that does not conform to the shape of the opening. The desired shape of the beam is obtained, but the part of the beam absorbed by the plate represents a significant loss of energy. In addition, if the light beam has a high power flux-density, this solution is not satisfactory, as the increase in the plate temperature caused by the absorption of the beam can damage the device. This type of device is therefore not compatible with high-power light sources.

More generally, there are also spatial light modulators (generally referred to as SLMs), which allow the spatial modulation in intensity, phase and polarization of a light beam. But these devices also have disadvantages. They are generally slow and relatively expensive. In addition, when an SLM is used to perform spatial modulation of a beam, significant energy losses cannot be avoided, so it is preferable to avoid using this type of device, especially if it is used with a high power light source.

One purpose of the present disclosure is to allow the conversion of the variation of a parameter of the laser beam, in particular, the transverse position and/or the angle of incidence and/or the angle of rotation of the beam, into the variation of the shape of this beam.

BRIEF SUMMARY

In order to achieve this purpose, an object of the present disclosure is to provide a device for alternating between different specific shapes of a light beam generated by a light source, the device comprising a multi-plane conversion device that is used to apply a unitary transformation to a light beam by means of a succession of elementary transformations and arranged facing the light source so that the light beam is emitted into the multi-plane conversion device along a reference axis.

The device comprises automated means, arranged upstream of the multi-plane conversion device, capable of varying the transverse position and/or angle of incidence of the beam with respect to the reference axis and/or varying the angle of rotation of the beam about the reference axis.

The multi-plane conversion device is configured to transform a variation in the transverse position and/or the angle of incidence and/or the angle of rotation of the beam into a change in the specific shape of the light beam.

The multi-plane light conversion device, more commonly referred to as "Multi-Plane Light Converter" (MPLC), is described in the article "Programmable unitary spatial mode manipulation" published in the "Journal of the Optical Society of America A," volume 27, issue 11. In particular, it is stated that it is possible to describe any unitary transformation of a coherent light beam by a succession of simple or elementary transformations. The MPLC is also described in document EP-2 469 221.

Thus, the present disclosure allows the transformation of the variation of a first parameter (the transverse position and/or the angle of incidence of the beam with respect to the reference axis and/or to vary the angle of rotation of the beam about the reference axis) into a variation of a second parameter (such as the shape of the light beam), these two parameters being selectable independently of each other. It is therefore free from the constraints imposed by the known devices mentioned above. In other words, when it is desired to modify a beam parameter (the second parameter), one can choose the parameter, the variations of which are best controlled (the first parameter). The MPLC is then used to benefit from the mastered control of variations in the first parameter over the modification of the second parameter.

Since the MPLC is generally used to correct a light beam after passing through a medium that distorts the beam, the present disclosure constitutes a clever use of the MPLC to improve the beam control.

In addition, the MPLC works by reflection. This means that the beam entering the MPLC is only reflected and is therefore not absorbed. Embodiments of the present disclosure therefore avoid the disadvantages associated with the devices operating by absorption, which makes embodiments of the present disclosure compatible with high-power light sources such as lasers.

According to other advantageous and unrestrictive characteristics of the present disclosure, taken alone or in any technically feasible combination:

- the automated means comprise a mirror placed on the path of the light beam, the orientation of which can be controlled to vary the angle of incidence of the light beam with respect to the reference axis;
- the automated means include two mirrors, the orientation of which can be controlled to offset the light beam transversely with respect to the reference axis;
- the multi-plane conversion device is configured to transform a variation in the transverse position of the beam into a change in the specific shape of the light beam; and
- the light source is a laser source.

The disclosure also relates to a laser beam machining system including the device for alternating between different specific shapes of a light beam.

BRIEF DESCRIPTION OF THE DRAWINGS

Several embodiments of the disclosure will now be described, while referring to the appended drawings, wherein:

FIG. 1 is a schematic view illustrating a device for processing a light beam according to the present disclosure;

FIGS. 2a and 2b illustrate two optical assemblies for varying the angle of the direction of propagation of the light beam with respect to a reference axis and for transversely shifting the direction of propagation of the light beam with respect to the reference axis.

DETAILED DESCRIPTION

Figure 3A:
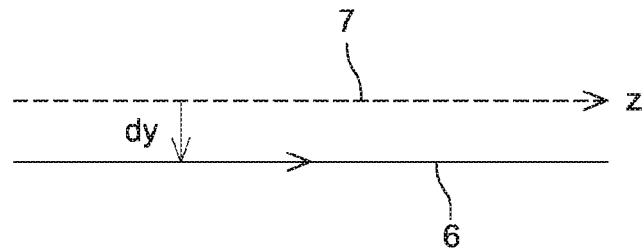
FIGS. 3a, 3b and 3c illustrate some of the parameters of the light beam, FIG. 4 schematically illustrates a first application of the disclosure, FIGS. 5 to 6 schematically illustrate a device for changing the shape of a light beam according to the disclosure.

FIG. 1 shows a schematic diagram of a light beam processing device 2. This device 2 is placed in front of a coherent light source 4 capable of generating a coherent light beam 6. This can be a laser source.

The device 2 comprises automated means 8 capable of varying a first parameter of the transverse profile of the light beam 6. When these automated means 8 are not activated, the light beam 6 propagates along a so-called reference axis 7.

Two examples of automated means 8 are shown in FIGS. 2a and 2b.

In FIG. 2a, the automated means 8 comprises a mirror 10, the orientation of which can be controlled, placed on the path of the light beam 6. By rotating the mirror by an angle $\alpha$ with respect to a frame of the device 2 along a Z axis as shown in FIG. 2a, the angle of the propagation direction of the light beam 6 with respect to the reference axis 7 is varied by $2\alpha$. In this case, the first parameter is the angle of incidence of the light beam 6 with respect to the reference axis 7.

In FIG. 2b, the automated means 8 comprises two parallel mirrors 10, 10' arranged so that the light beam 6 is reflected by the two mirrors 10, 10'. By rotating the two mirrors 10, 10' at an angle $\beta$ in opposite directions with respect to a frame of the device 2 along the Z axis, the propagation direction of the light beam 6 is shifted transversely by $d_y$ with respect to the reference axis 7. In particular, $d_y$ is a function of the distance between the mirrors and the angle $\beta$. In this case, the first parameter is the transverse position of the light beam 6 with respect to the reference axis 7.

With reference to FIG. 1, the device 2 comprises a multi-plane light conversion (MPLC) device. The MPLC here is located downstream of the automated means 8 considering the direction of propagation of the light beam 6, but the MPLC could be placed upstream of the automated means 8. The MPLC is arranged to transform the variation of the first parameter into a variation of a second parameter of the transverse profile of the light beam 6. The functioning of the MPLC is described in the article mentioned above and will not be described again in the following.

Figure 3B:
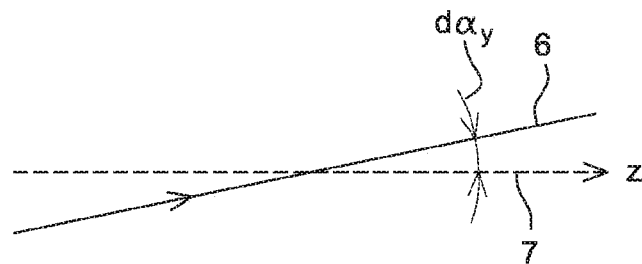
Figure 3C:
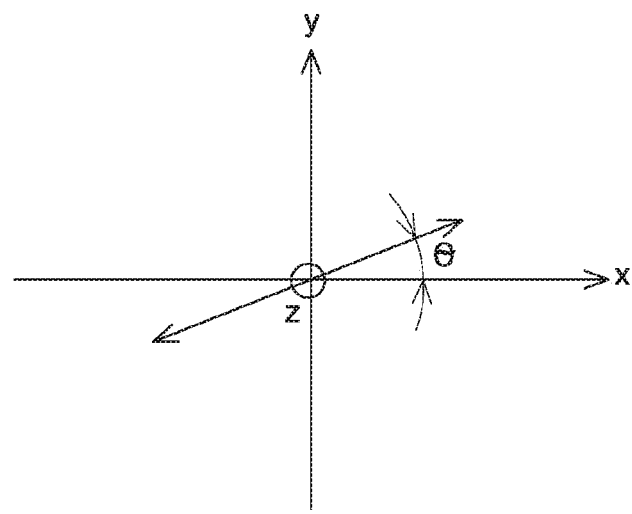

Some of the parameters of the light beam 6 have been illustrated in FIGS. 3a, 3b and 3c. In these figures, the views are from an orthogonal reference frame of axes x, y, z in which z is an axis coinciding with the reference axis 7 and the axes x and y are perpendicular to the axis z.

In FIG. 3a, dy is the position in the plane (yz) of the light beam 6 with respect to the reference axis 7. In FIG. 3b, $da_y$ is the angle of the beam in the plane (yz) of the light beam 6 with respect to the reference axis 7. In FIG. 3c, $\theta$ is the angle of rotation of the light beam 6 around the reference axis 7.

The general principle of the disclosure is discussed in further detail below.

As a preliminary matter, it is known that the electromagnetic field of the light beam 6 can be described by a multi-variable function $E(\alpha, \beta, \gamma, \ldots)$ in which the parameters $\alpha, \beta, \gamma, \ldots$) describe the parameters that specify the light beam 6, such as the transverse mode that describes its geometry in the transverse direction.

In the simplest case, if it is desired to modify a single variable or parameter continuously while setting all the other parameters, the equation can be expressed using a limited development:

$$E(\alpha - \alpha_0) = \sum_{i=0}^{n} \frac{\partial^i E}{\partial \alpha^i}(\alpha_0) \times \frac{(\alpha - \alpha_0)^i}{i!} + o((\alpha - \alpha_0)^n)$$

In this equation, it may be desired to vary the parameter α, and it is noted that the modes $$\frac{\partial^i E}{\partial \alpha^i}(\alpha_0)$$

depend only on initial point $\alpha_0$. These are spatial modes of the electromagnetic field. In the case where these are not all identical (i.e., if the trajectory is different from the identity), an orthonormal base of the field can be deduced from these derived modes.

From a given trajectory, i.e., the choice of a physical parameter to be varied α, as well as an interval in which it is desired to be varied ($[\alpha_a, \alpha_b]$), the orthonormalized base corresponding to this movement is calculated. This base will be called the "output base D." The size of this base depends on the precision with which the trajectory is to be followed. The higher the number of modes, the greater the accuracy, according to the principle of limited development.

The coefficients that describe the movement in this database are also calculated. Indeed, since the orthonormal version of the base described by the successive derivatives of the field is used, the coefficients describing each of the positions are not trivial.

The second step is to choose an "entry base D." The choice of this base is conditioned by two elements. On the one hand, the parameters that will be described in this database must be masterable, i.e., continuously, accurately and over a sufficient distance. This is the case, for example, of the transverse position of the light beam 6. On the other hand, all the coefficients necessary to describe the trajectory chosen in "output base D" must be achievable in "entry base D." The operation to be carried out is described below.

$$\begin{pmatrix} f_0(\alpha) \\ f_1(\alpha) \\ \vdots \\ f_n(\alpha) \end{pmatrix} \begin{pmatrix} v_0 \\ v_1 \\ \vdots \\ v_n \end{pmatrix} = [MPLC] \begin{pmatrix} f_0(\alpha) \\ f_1(\alpha) \\ \vdots \\ f_n(\alpha) \end{pmatrix} \begin{pmatrix} u_0 \\ u_1 \\ \vdots \\ u_n \end{pmatrix}$$

The base ($v_n$) describes the output base, the base ($fn$) the input base. The functions $f_n$ describe the projection coefficients in the output base that must be performed in the input base in order to describe the desired path. These operations allow the MPLC to be calibrated to the desired application of the device 2.

First Application

Figure 4:
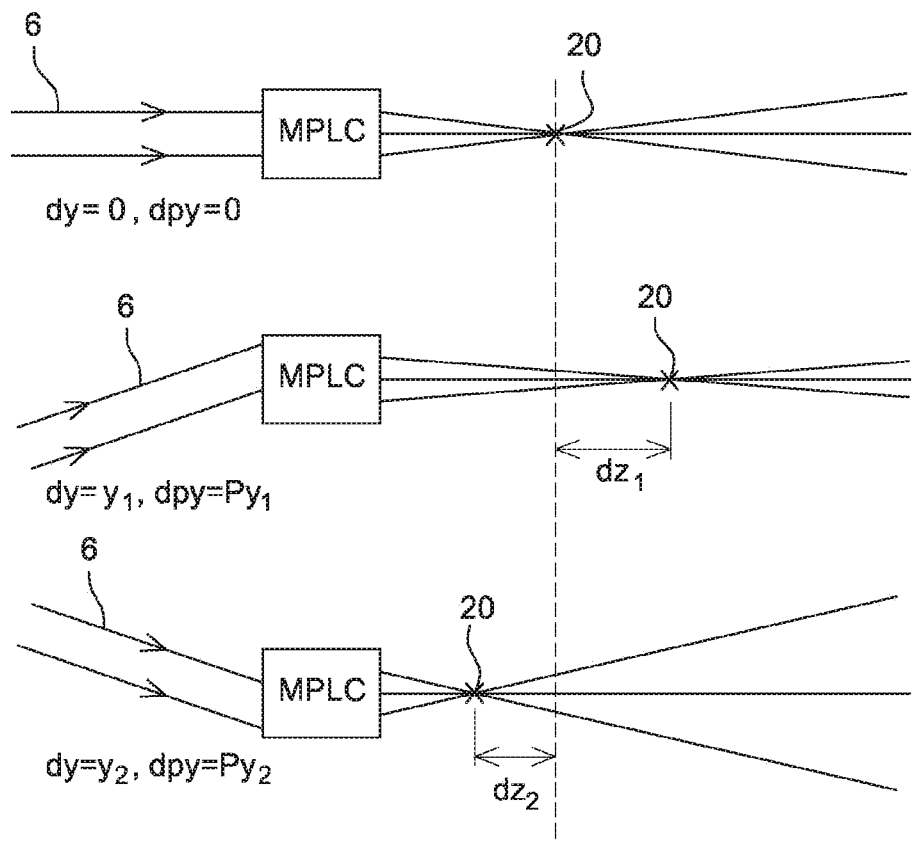

A first application of the device of the disclosure will now be presented, with reference to FIG. 4. Here, the second parameter, the one that is desired to be mastered, is the "defocusing" of the light beam 6, i.e., the displacement of the position dz1, dz2 of a focusing position 20 of the light beam 6. The first parameter, the one that can be mastered, is the transverse position $d_y$ and/or the angle of incidence $d_{py}$ of the light beam 6 with respect to the reference axis 7. It could also be the angle of rotation of the light beam around this reference axis.

The degrees of freedom chosen as "entry" are therefore the displacement of the light beam 6, the inclination of the light beam 6 and/or the orientation of the light beam 6 in a transverse direction.

The position and the angle of the light beam 6 with respect to the reference axis 7 are parameters that can be mastered. This is not the case for the focusing position 20 of the light beam 6. Thanks to the device 2, in particular, the MPLC, and a modal approach to this problem, the position and the angle of the light beam 6 at the input of the MPLC can be coupled to its defocusing at the output. Thus, the position of the focusing point of the light beam 6 can be mastered, i.e., precisely, at high frequency and continuously, over an amplitude defined by the characteristics of the MPLC or in other words its "design D." In other words, the device 2 allows the implementation of a method for processing the light beam 6 using the MPLC in which:

the light beam 6 is emitted into the MPLC along the reference axis 7, the first parameter is varied, and by propagation in the MPLC, it transforms the variation of the first parameter into a variation of the second parameter, i.e., the position of the beam focusing point.

Second Application

Figure 5:
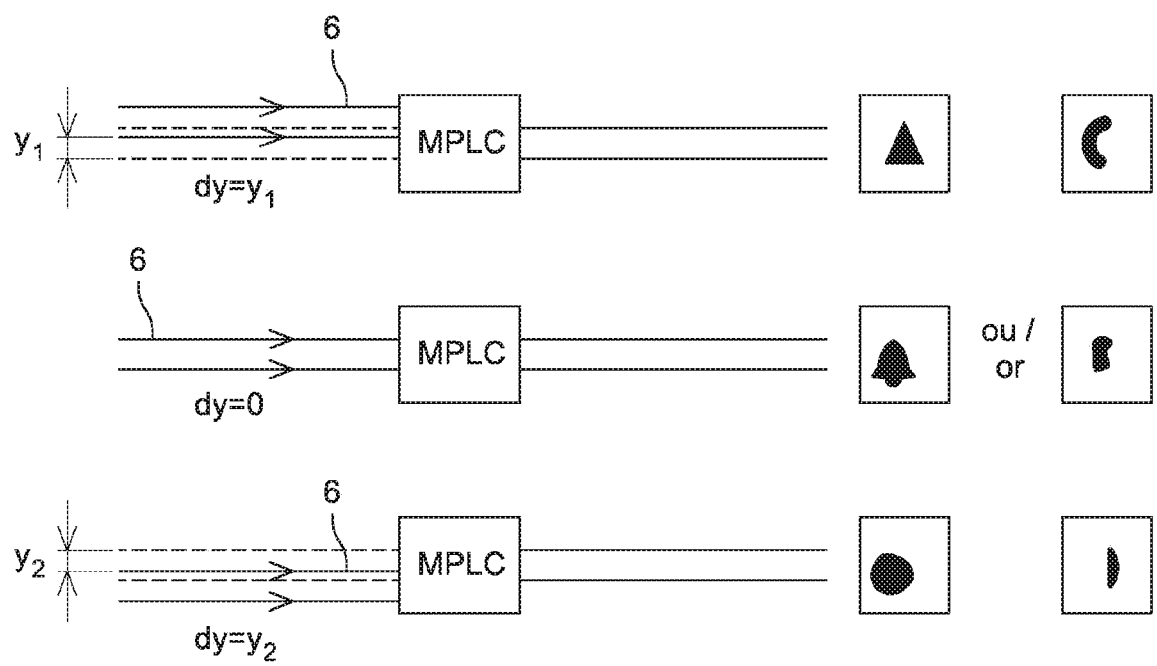

A second application of the operative part of the disclosure is described below, with reference to FIG. 5.

This is a generalization of the defocusing application of the first embodiment presented in the previous section. The direction and angle of the input light beam 6 of the MPLC determine its decomposition in a so-called "input" mode base. The MPLC is configured to determine the output base that allows switching from one shape to another (focus point beam or defocused beam, square triangle shape, straight line parenthesis shape, etc.). Thus, as clearly shown in FIG. 5, in the absence of activation of the automated means 8, in the rest position (in the center of FIG. 5, dy=0) the light beam 6 propagates in the multi-plane conversion MPLC device along the reference axis to form a beam with a bell or keyhole shape. When the automated means 8 are operated to impose a transverse displacement $y_1$ of the beam (upper part of FIG. 5), the light beam propagates through the multi-plane conversion MPLC device and undergoes a transformation that causes the shape of the beam to vary to a triangle or parenthesis shape. Similarly, when the automated means 8 are operated to impose another transverse displacement $y_2$ of the beam (lower part of FIG. 5), the light beam 6 propagates into the multi-plane conversion MPLC device and undergoes another transformation resulting in the shape of the beam varying to a disc or half-moon shape.

A particularly advantageous application of this change in the beam shape is laser beam machining, for which it is advantageous to be able to generate beam shapes specific to the operation to be performed. The present disclosure provides the ability to quickly switch between different shapes in order to perform different operations with the same beam and shaping device. The angle and the position of the input beam can be changed easily and at high frequency. This makes it possible to quickly switch between different beam shapes during machining. In addition to its versatility, the advantage of this system is that the mirrors used to direct the beam upstream of the MPLC, as well as the MPLC itself, are compatible with high power beams.

Figure 6:
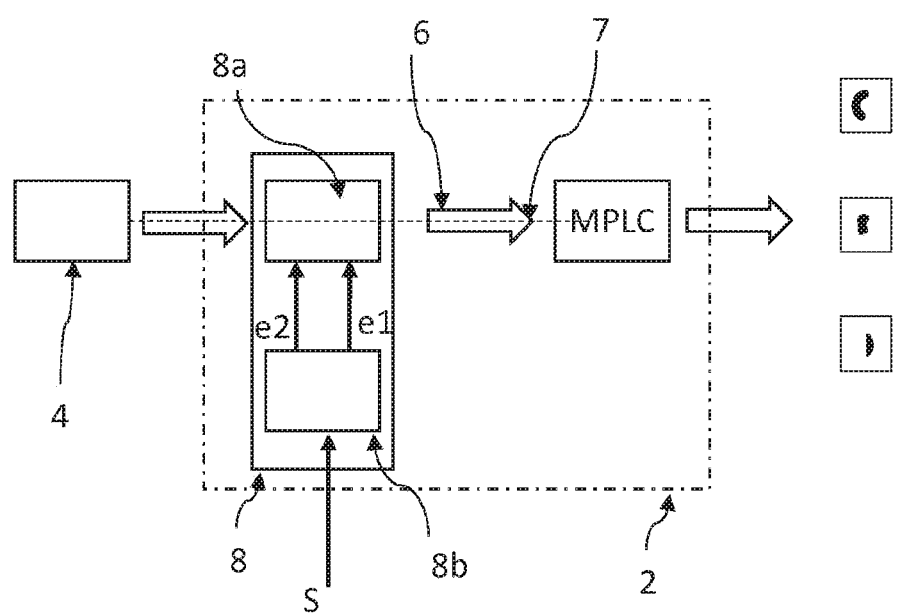

As shown in FIG. 6, a device 2 to change the shape of a coherent light beam 6 includes automated means 8 capable of varying the first parameter. The automated means 8 are located upstream of a multi-plane conversion MPLC device. As already stated, the first parameter (or parameters) is/are chosen from the transverse position of the beam with respect to the reference axis, the angle of incidence of the beam with respect to the reference axis, and the angle of rotation of the beam about the reference axis.

The automated means may comprise an optical device 8a composed of one or more mirror(s), as mentioned in the general description of the disclosure. Such mirror(s) can be controlled in orientation, by means of piezoelectric or galvanometric motors operatively coupled therewith. Other controllable optical parts could also be used to replace or complement the mirrors to form the optical device 8a. This device could comprise Bragg cells, deformable mirrors, micro-mirrors, or spatial light modulators (SLM).

To control these optical parts and vary the first parameter(s) of the beam, the automated means 8 may also comprise a control device 8b. The control device 8b can be a microprocessor, a micro-controller or any other electronic device likely to apply an input signal to establish an output signal. In the case of the example shown in FIG. 6, the control device 8b is provided with an input S making it possible to select the specific shape of the light beam 6. The control device 8b processes this selection to establish one or more control(s) e1, e2 to control the orientation of the mirror(s), or more generally to control the controllable optical parts, of the optical device 8a and to vary the first parameter(s), i.e., the transverse position, the angle of incidence and/or the angle of rotation of the beam.

The beam generated by the light source 4, and possibly modified by the automated means, is emitted into the multi-plane conversion MPLC device. For the sake of completeness, it is briefly recalled below that such a device includes at least one optical part, the spatial phase profile of which is configured to impart a plurality of elementary transformations to an incident light radiation. The combination of these elementary transformations makes it possible to carry out all unitary transformations on this incident radiation. In other words, such a device can be configured to transform any orthonormal base of spatial modes of an entry space into any other orthonormal base of spatial modes of an exit space.

Document FR3016973 provides a specific example of the implementation of such a multi-plane conversion device. It comprises a reflective optical part having a micro-structured surface that spatially modifies the transverse phase of an incident light radiation, placed opposite a mirror, so as to form a multi-pass cavity making it possible to apply the plurality of elementary transformations. "Micro-structured surface" means, for example, that the surface can have "pixels," the dimensions of which range from a few microns to a few hundred microns. Each pixel has an elevation, relative to an average plane defining the surface in question, between a few microns and a few hundred microns. The reflective optical part with a micro-structured surface can be a phase plate.

Reference may be made to the various documents cited in the state of the art to fully understand how the repeated transformation of the spatial phase of incident radiation makes it possible to carry out a selected unitary transformation of the incident light radiation and how the optical part can be designed to carry out such a transformation. These documents should also be referred to for examples of digital design methods for micro-structures on the main face of the optical part. The digital model of these micro-structures can be used to manufacture the optical part, for example, by machining, molding and/or engraving a raw optical part.

Many alternatives to the multi-pass cavity configuration are possible. It can thus be envisaged for the multi-plane conversion MPLC device to comprise a plurality of micro-structured optical parts, for example, a plurality of reflective phase plates juxtaposed to each other. This plurality of optical parts can be placed on the support to form a first complex optical path, for example, to try to make the multi-plane conversion device very compact. The mirror of the multi-passage cavity can be replaced by a second micro-structured reflective phase plate, to double the number of elementary transformations performed on the incident radiation or to allow, for a given number of reflections, to form a multi-passage cavity twice as compact.

According to another alternative solution, the micro-structured optical part is not reflective, but transparent. It can thus be expected that a transparent micro-structured optical part, for example, placed in an optical cavity formed by two mirrors placed opposite each other, can intercept a plurality of times the incident light radiation to carry out the transformations. Alternatively, it may be a plurality of transparent optical parts, arranged one behind the other along the optical path of radiation propagation.

It is also possible to combine one or more micro-structured transparent optical part(s) with one or more reflective optical part(s). Other non-micro-structured optical parts, such as mirrors, prisms can also be placed along the optical path, as required.

Regardless of how the multi-plane conversion MPLC device of a device 2 is implemented to change the shape of a coherent light beam in accordance with the disclosure, it applies a transformation to the light beam 6 leading to a change in its shape according to the transverse position, the angle of incidence and/or the angle of rotation of the beam, with respect to the reference axis 7, presented at its input.

Of course, the disclosure may be modified in many ways without going beyond the scope of the disclosure as defined by the claims.

In particular, the device 2 may include other optical parts that intercept the propagation of the light beam 6 than those described. These may be mirrors, lenses or any other part used to control the propagation of the light beam 6, for example, to collimate it or to try to make the control device 2 compact.

The invention claimed is:

1. A device for alternating between different specific shapes of a light beam generated by a light source, comprising:
   the light source;
   a multi-plane light conversion (MPLC) device that is used to apply a unitary transformation to a light beam by means of a succession of elementary transformations of its spatial phase imparted by at least one optical part having a microstructured surface, the multi-plane light conversion (MPLC) device being arranged facing the light source so that the light beam is emitted into the multi-plane light conversion (MPLC) device along a reference axis; and
   an automated device located upstream of the multi-plane light conversion (MPLC) device, the automated device configured to vary a transverse position and/or an angle of incidence of the light beam in relation to the reference axis and/or to vary an angle of rotation of the light beam about the reference axis; and
   wherein the multi-plane light conversion (MPLC) device is configured to transform a variation of a transverse position and/or an angle of incidence and/or an angle of rotation of the light beam into a modification of the specific shape of the light beam.

2. The device of claim 1, wherein the automated device comprises a mirror placed in a path of the light beam and an orientation of which can be controlled to vary the angle of incidence of the light beam relative to the reference axis.

3. The device of claim 1, wherein the automated device comprises two mirrors, the orientations of which can be controlled to transversely shift the light beam relative to the reference axis.

4. The device of claim 3, wherein the multi-plane light conversion device is configured to transform a variation in the transverse position of the light beam into a modification of the specific shape of the light beam.

5. The device of claim 1, wherein the light source comprises a laser source.

6. The device of claim 1, wherein the multi-plane light conversion device is configured to transform a variation in the transverse position of the light beam into a modification of the specific shape of the light beam.

7. The device of claim 1, wherein the multi-plane light conversion device comprises a mirror facing the microstructured surface.

8. The device of claim 1, wherein the microstructured surface comprises pixels, each pixel having an elevation relative to an average plane defining the surface.

9. The device of claim 8, wherein the elevation of each pixel is between 1 micron and 1000 microns.

10. A laser beam machining system comprising a device for changing the shape of a laser beam according to claim 1.

* * * * *